(12) United States Patent
Guo

(10) Patent No.: US 12,215,819 B2
(45) Date of Patent: Feb. 4, 2025

(54) TELESCOPIC SUPPORT AND LAPTOP STAND HAVING SAME

(71) Applicant: Jianhua Guo, Guangdong (CN)

(72) Inventor: Jianhua Guo, Guangdong (CN)

( * ) Notice: Subject to any disclaimer, the term of this patent is extended or adjusted under 35 U.S.C. 154(b) by 110 days.

(21) Appl. No.: 18/173,832

(22) Filed: Feb. 24, 2023

(65) Prior Publication Data

US 2023/0204153 A1 Jun. 29, 2023

(51) Int. Cl.
*F16M 11/26* (2006.01)
*F16M 11/10* (2006.01)
*F16M 11/20* (2006.01)
*F16M 11/38* (2006.01)

(52) U.S. Cl.
CPC ............ *F16M 11/26* (2013.01); *F16M 11/10* (2013.01); *F16M 11/2014* (2013.01); *F16M 11/2021* (2013.01); *F16M 11/38* (2013.01); *F16M 2200/024* (2013.01); *F16M 2200/028* (2013.01)

(58) Field of Classification Search
CPC .... F16M 11/26; F16M 11/10; F16M 11/2014; F16M 11/2021; F16M 11/38; F16M 2200/024; F16M 2200/028
See application file for complete search history.

(56) References Cited

U.S. PATENT DOCUMENTS

| | | | | |
|---|---|---|---|---|
| 7,036,168 B1 * | 5/2006 | Knickerbocker | ...... | A61G 13/12 5/636 |
| 9,226,587 B2 * | 1/2016 | Halimi | ................... | A47C 16/00 |
| 9,803,795 B2 * | 10/2017 | Brandt | .................. | G06F 1/1601 |
| 10,323,791 B1 * | 6/2019 | Liu | .......................... | F16B 2/065 |
| 10,610,010 B2 * | 4/2020 | Matlin | ............... | F16M 11/2014 |
| 10,813,451 B2 * | 10/2020 | Hill | ......................... | F16M 11/10 |
| 10,973,315 B2 * | 4/2021 | Haham | ............... | F16M 11/2021 |
| 11,337,322 B2 * | 5/2022 | Pan | ......................... | F16M 11/26 |
| 11,629,816 B2 * | 4/2023 | Olson | .................. | A47B 23/002 248/121 |
| 11,737,570 B2 * | 8/2023 | Stone | ..................... | A47C 16/00 248/118 |
| 11,754,217 B2 * | 9/2023 | Leman | ................. | F16M 13/022 248/442.2 |
| 11,852,280 B2 * | 12/2023 | Chen | ...................... | F16M 11/38 |
| 11,930,931 B2 * | 3/2024 | Stone | ..................... | A47C 7/383 |
| 11,959,584 B2 * | 4/2024 | Feng | ...................... | F16M 11/24 |
| 2016/0331126 A1 * | 11/2016 | Mills | ...................... | F16M 11/26 |
| 2019/0203875 A1 * | 7/2019 | Yu | .......................... | F16M 11/42 |

FOREIGN PATENT DOCUMENTS

| | | | | |
|---|---|---|---|---|
| DE | 202015007582 U1 * | 3/2016 | ............ | B60R 11/02 |
| WO | WO-2017019254 A1 * | 2/2017 | .......... | A47B 23/043 |

* cited by examiner

*Primary Examiner* — Eret C McNichols
(74) *Attorney, Agent, or Firm* — Daniel M. Cohn; Howard M. Cohn

(57) ABSTRACT

A telescopic support includes a positioning device, a panel fixing member, two fixed rods, and two lifting rods. One ends of the two lifting rods are equipped on both sides of the panel fixing member, and the other ends thereof rods are plugged into the corresponding fixed rods and move in an axial direction of the fixed rods. During the lifting process of the lifting rods, the relative positions between the lifting rods and the fixed rods are maintained via the positioning device.

3 Claims, 6 Drawing Sheets

TELESCOPIC SUPPORT AND LAPTOP STAND HAVING SAME

FIELD OF THE INVENTION

The invention relates to laptop stand accessories and more particularly to a telescopic support and a laptop stand including same.

BACKGROUND OF THE INVENTION

In the information age, computers are closely related to our study, work and life. Laptops are small and portable, and are thus favored by the majority of white-collar workers, students and business people. But the current situation is that when a laptop is placed on an ordinary desktop for use, the display screen position is relatively low, and people can only use the laptop in a bad sitting position of leaning forward and looking down, which increases the pressure on the neck. Ergonomic studies have shown that when the neck anteversion is 15°, there is no neck discomfort and electromyogram change observed at desk for 6 hours; and when the neck anteversion exceeds 30°, neck discomfort increases significantly. If a person's cervical vertebra leans forward excessively for a long time, symptoms such as neck pain and limited movement will appear, which even leads to the occurrence of cervical spondylosis.

At present, the way to solve this problem is to reasonably raise the display screen by using a laptop table, so that people can use laptops with correct sitting postures with their heads up and their chests out to reduce the forward angle of anteversion of the cervical vertebra, thereby effectively reducing the stress on the cervical vertebrae, preventing the occurrence of cervical spondylosis, and improving people's quality of life.

The telescopic support in the typical lifting laptop stand is telescopic by means of screw and nut locking, and the telescopic adjustment is cumbersome, time-consuming and labor-intensive, so that operation is inconvenient for users.

Thus, the need for improvement still exists.

SUMMARY OF THE INVENTION

In order to solve the above problems, the invention provides a telescopic support and a laptop stand including same, free adjustment of height and angle can be realized, and functions of HUB and wireless charging are realized at the same time.

In order to achieve the above object, the technical solution adopted in the invention is: a telescopic support, including a positioning device, a panel fixing member, two fixed rods, and two lifting rods, where one ends of the two lifting rods are equipped on both sides of the panel fixing member, and the other ends of the two lifting rods are plugged into the corresponding fixed rods and move in an axial direction of the fixed rods; and during the lifting process of the lifting rods, the relative positions between the lifting rods and the fixed rods are maintained via the positioning device.

Further, the positioning device includes clamp plates located on the inner side walls of the fixed rods, and buckle assemblies located at the lower ends of the lifting rods; a plurality of locking slots corresponding to the buckle assemblies are arranged on the surfaces of the clamp plates, where the lifting rods are matched with the locking slots via the buckle assemblies to achieve positioning.

Further, each buckle assembly includes a buckle spring, a buckle block provided with a clamp block on the side, and a buckle sleeve with a release opening formed in the side; the buckle sleeves are equipped on the lower ends of the lifting rods, and the buckle blocks and the buckle springs are all arranged in the buckle sleeves, where one ends of the buckle springs are connected to the inner walls of the buckle sleeves, and the other ends support on the side walls of the buckle blocks; and under the action of the buckle springs, the buckle blocks pass through the release openings and enable the clamp blocks and the locking slots to snap.

Further, the positioning device also includes a pulling device located in the panel fixing member; the pulling device includes a pulling cover plate, pulling link rods, and return springs, where the pulling cover plate, the pulling link rods and the return springs are all internally arranged in the panel fixing member, and the surface of the pulling cover plate is provided with a pulling button that extends out of the panel fixing member, where one ends of the return springs abut against the inner wall of the panel fixing member, and the other ends support on the surface of the pulling cover plate and make the pulling button remain exposed; the buckle blocks are self-provided with through holes, and the bottoms of the buckle blocks are provided with slope notches that are communicated with the through holes; both sides of the pulling cover plate are provided with the pulling link rods, which pass through the panel fixing member, the lifting rods and the buckle blocks in order, and the ends of the pulling link rods are bent into an oblique line structure, where by means of the pulling button, the oblique line structure at the ends of the pulling link rods squeezes the slope notches of the buckle blocks, and makes the clamp blocks on the buckle blocks move in a direction away from the locking slots.

The invention provides a telescopic laptop stand capable of freely lifting, including a panel, a base plate assembly, a base plate fixing member, and the telescopic support mentioned above, where the base plate fixing member is fixed on the surface of the base plate assembly, the panel is hinged to the panel fixing member via a first damping hinge member, and the ends of the telescopic support are hinged to both sides of the base plate fixing member via a second damping hinge member.

Further, the first damping hinge member includes corner connectors and damping shafts, where the sides of the corner connectors are movably equipped on the side surface of the panel fixing member via the damping shafts, and the surfaces of the corner connectors are fixedly connected to the bottom surface of the panel.

Further, the surface of the panel is provided with a receding opening with the shape corresponding to that of the base plate fixing member.

Further, the base plate assembly includes a first base plate and a second base plate, where a boss is arranged at the center of the first base plate, and the boss is provided with teeth in a circumferential direction thereof; a boss hole is arranged at the center of the second base plate, the second base plate is placed on the surface of the first base plate, and the boss passes through the boss hole; the surface of the second base plate is provided with a meshing slot, which is internally equipped with a meshing spring and meshing teeth, where one end of the meshing spring is connected to the meshing slot, and the other end is connected to the meshing teeth, and the meshing teeth are meshed with the teeth under the action of the meshing spring.

Further, a wireless charging module is arranged on the surface of the boss, and a HUB module is arranged inside the base plate fixing member, where the surface of the base plate fixing member is provided with a power supply port that is connected to the HUB module, and several output interfaces.

Further, four corner ends of the panel are provided with non-slip silicone pads, and one side of the panel is provided with a baffle used for preventing the laptop from falling.

The invention has the following advantages and benefits in comparison with the conventional art:

The whole product can be conveniently stored when in a folded and contracted state.

If the stand needs to be raised, the base plate of the panel can be directly flipped, and the damping shafts inside the panel fixing member and the base plate fixing member are used to achieve rotary lifting, so that the angle of the support panel can be freely adjusted. At this time, a laptop can be placed. If the height needs to be adjusted again, the pulling button can be pressed, and the lifting rods can move up and down freely.

The base plate assembly includes a first base plate and a second base plate. The second base plate can rotate 360° around the boss of the first base plate, which can drive the whole panel to rotate 360°. At the same time, since the boss is circumferentially provided with a plurality of teeth, the second base plate is adjusted in a plurality of stages by means of the cooperation of the meshing teeth and the teeth. When an appropriate angle is obtained through adjustment, the meshing teeth are meshed with the teeth under the action of the meshing spring to achieve positioning. When other angles need to be obtained through adjustment, the second base plate is pushed forcefully so that the meshing teeth are not meshed with the corresponding teeth.

The product integrates a wireless charging module and a HUB module, so that a user can also realize wireless charging for mobile terminals with a wireless charging function while using a laptop. Meanwhile, the HUB module can expand connection ports of the laptop, which is more convenient for office use.

A new pull rod lifting structure with simple operation steps is used, thereby optimizing the user experience. Compared with an angle adjustable stand that cannot be lifted, the lifting structure has a better user experience and more ways of use. Compared with a lifting stand with a non-adjustable angle, the lifting stand with the angle capable of being freely adjusted can adapt to customers with different needs. Compared with similar products in the market, the invention has more functions of adjusting the angle by means of the internal damping shafts, freely adjusting the lifting height by means of endless pull rods, being foldable for storage, and having better stability and reliability.

The above and other objects, features and advantages of the invention will become apparent from the following detailed description taken with the accompanying drawings

DETAILED DESCRIPTION OF THE INVENTION

Figure 1:
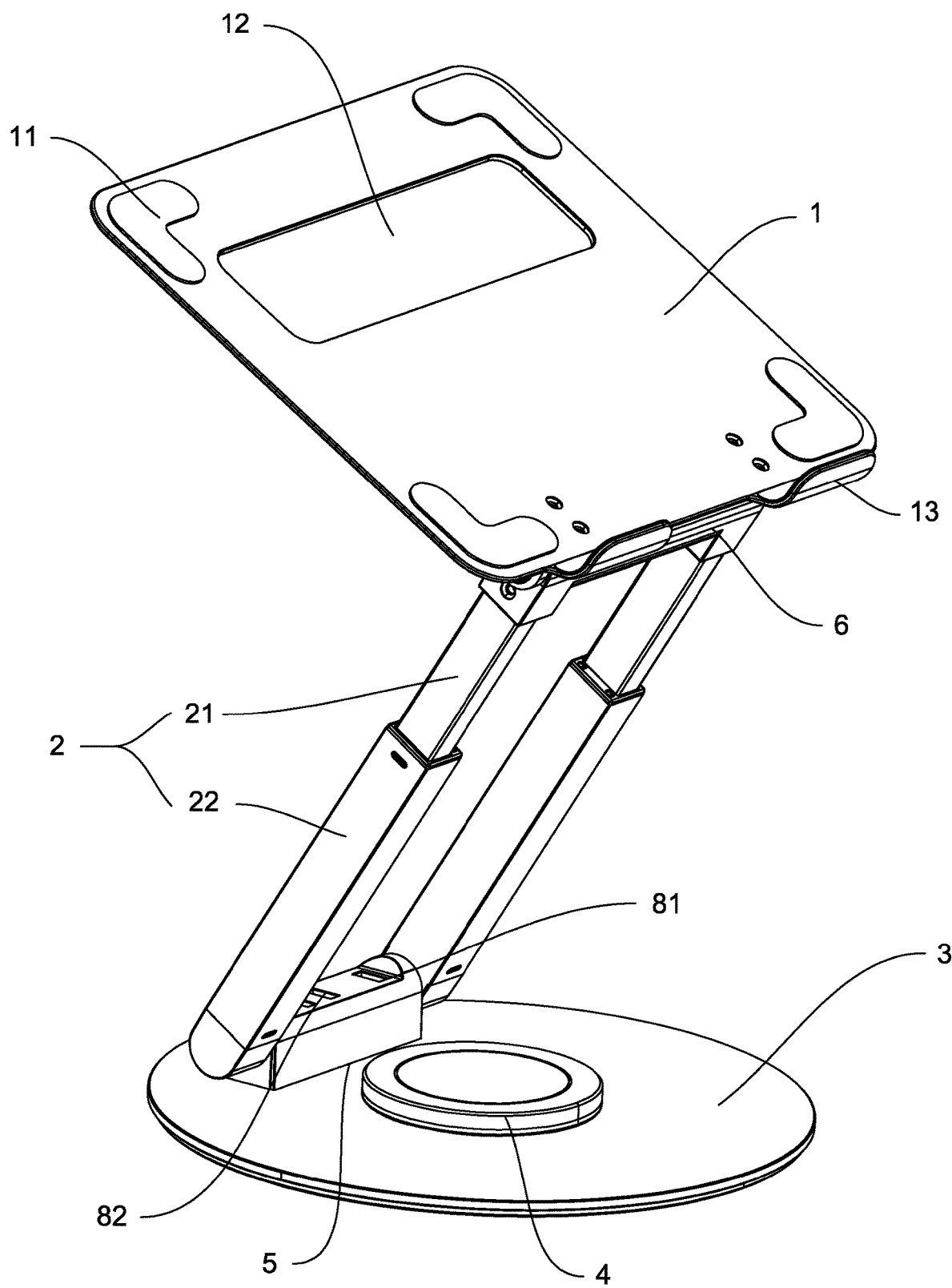
FIG. 1 is a perspective view of a laptop stand capable of freely lifting of a first preferred embodiment of the invention.
Figure 2:
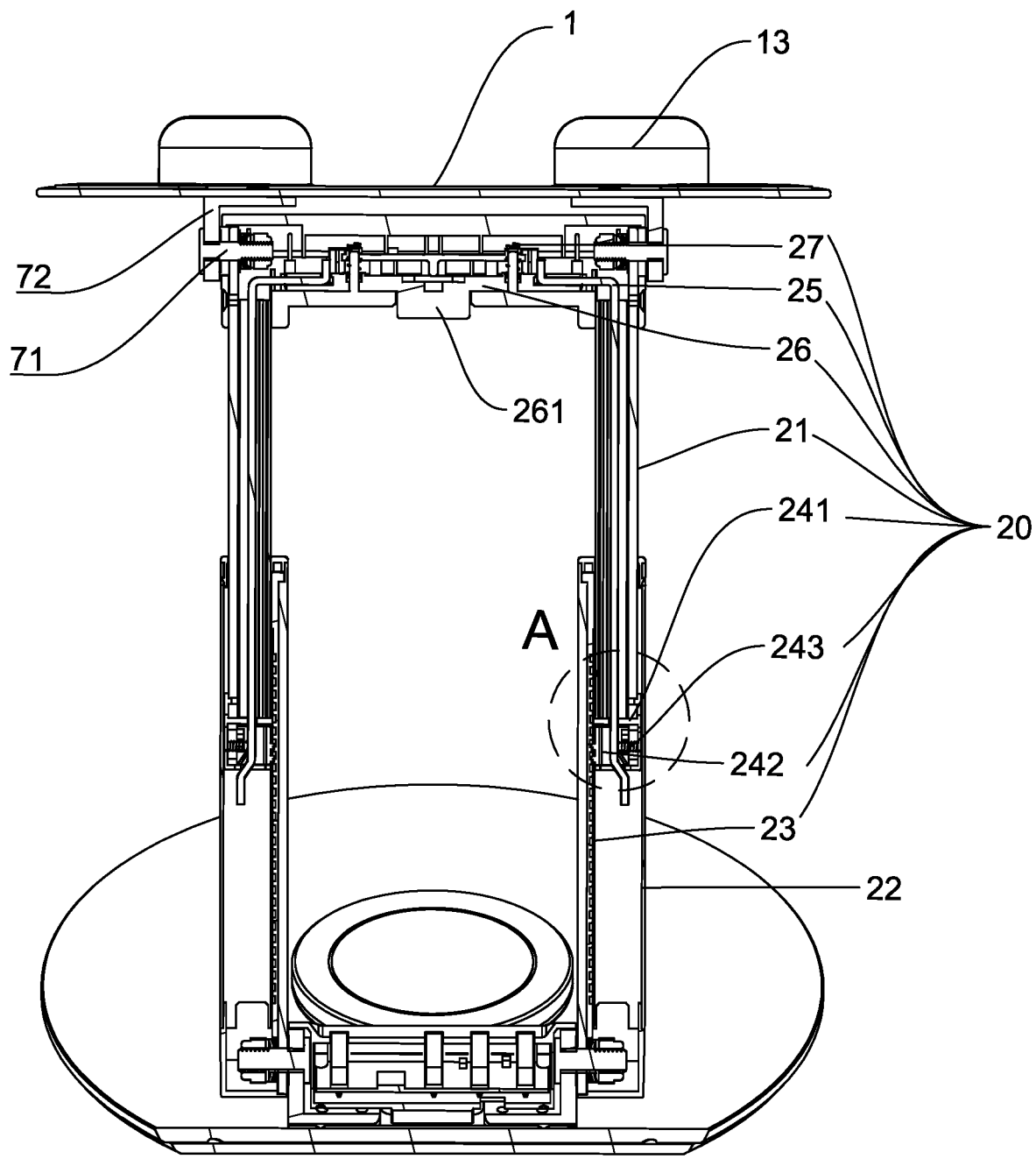
FIG. 2 is a cross-sectional view of the laptop stand.
Figure 2A:
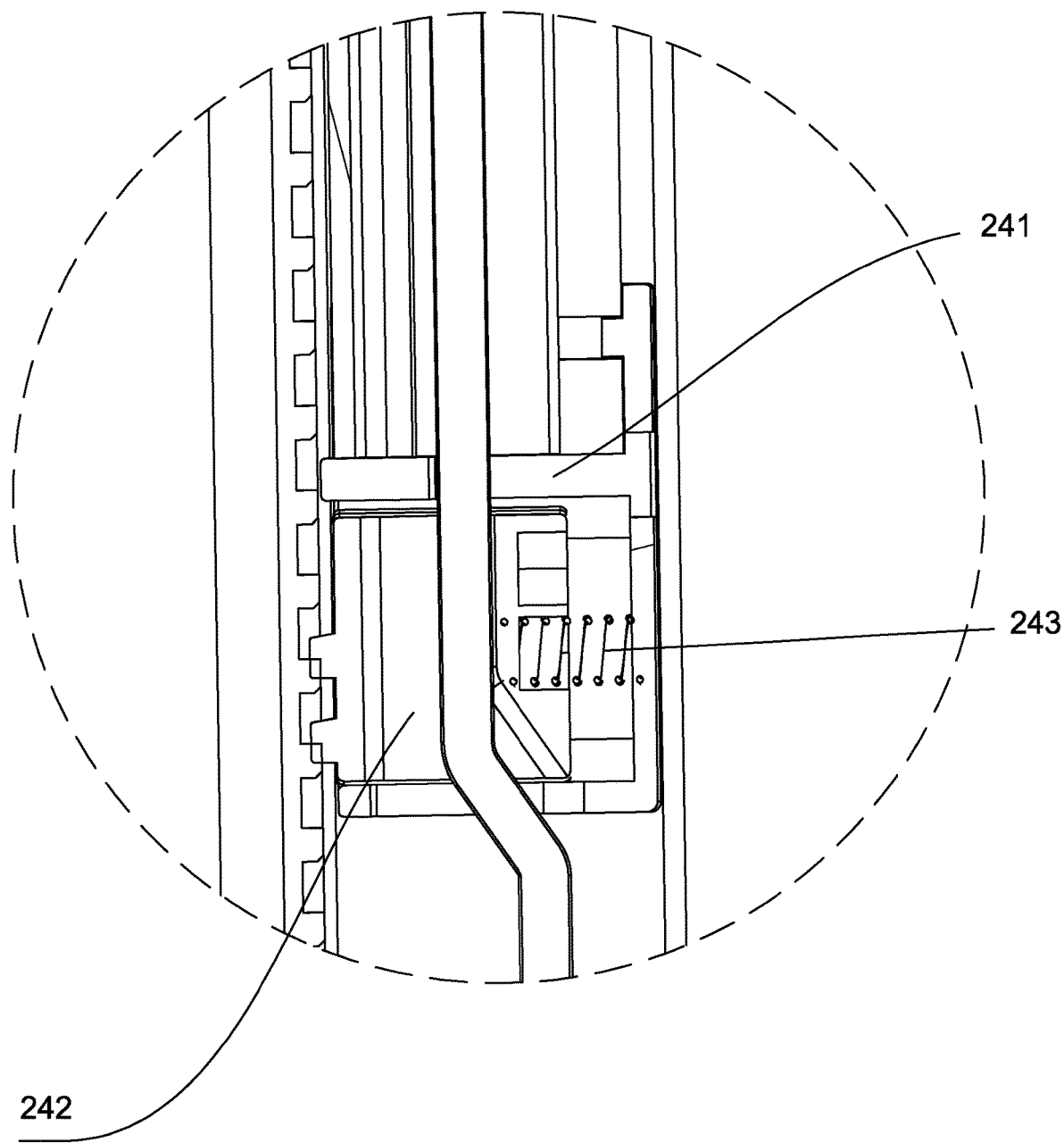
FIG. 2A is a detailed view of the area in circle A of FIG. 2.
Figure 3:
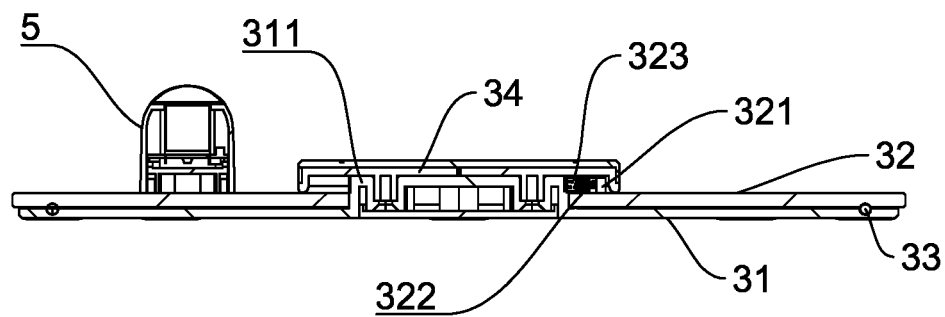
FIG. 3 is a longitudinal sectional view of the base plate assembly of the laptop stand.
Figure 4:
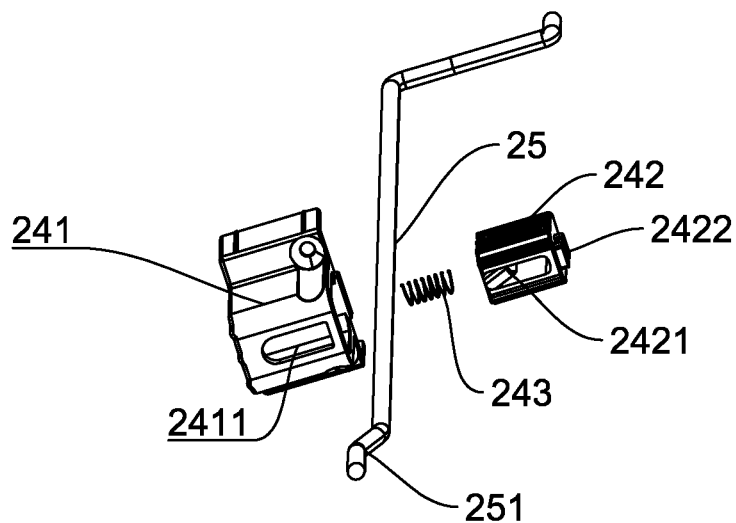
FIG. 4 is an exploded view of the buckle assemblies of the laptop stand.
Figure 5:
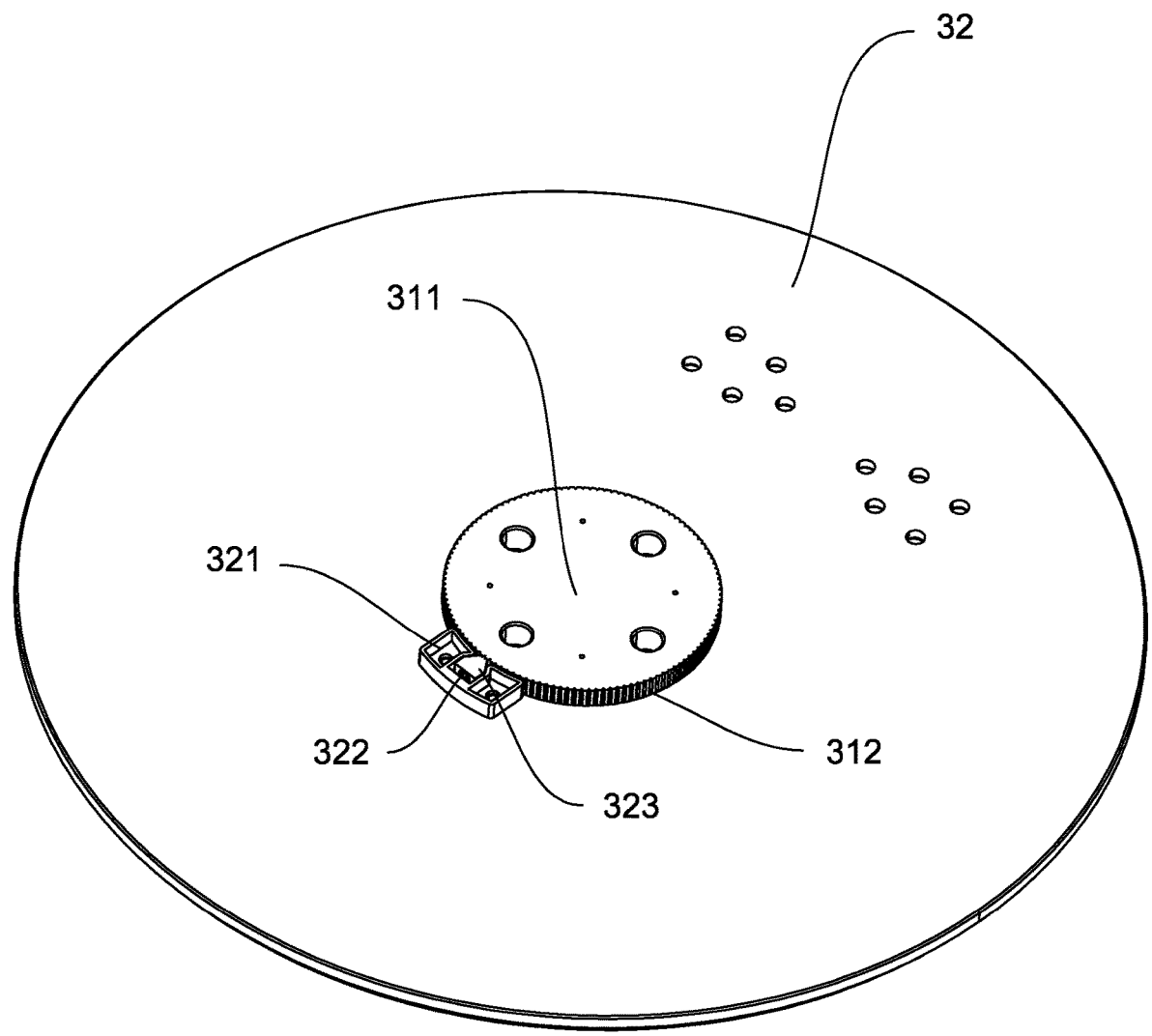
FIG. 5 is a perspective view of the base plate assembly of the laptop stand.

Referring to FIGS. 1 to 5, a laptop stand capable of freely lifting of a first preferred embodiment of the invention is shown. The laptop stand comprises a telescopic support 2 comprising a positioning device 20, a panel fixing member 6, two fixed rods 22, and two lifting rods 21, where one ends of the two lifting rods 21 are equipped on both sides of the panel fixing member 6, and the other ends of the two lifting rods 21 are plugged into the corresponding fixed rods 22 and move in an axial direction of the fixed rods 22; and during the lifting process of the lifting rods 21, the relative positions between the lifting rods 21 and the fixed rods 22 are maintained via the positioning device 20.

In the first embodiment, the positioning device 20 includes clamp plates 23 located on the inner side walls of the fixed rods 22, and buckle assemblies located at the lower ends of the lifting rods 21; a plurality of locking slots corresponding to the buckle assemblies are arranged on the surfaces of the clamp plates 23, where the lifting rods 21 are matched with the locking slots via the buckle assemblies to achieve positioning.

Meanwhile, each buckle assembly includes a buckle spring 243, a buckle block 242 provided with a clamp block 2422 on the side, and a buckle sleeve 241 define with a release opening 2411 formed in the side; the buckle sleeves 241 are equipped on the lower ends of the lifting rods 21, and the buckle blocks 242 and the buckle springs 243 are all arranged in the buckle sleeves 241, where one ends of the buckle springs 243 are connected to the inner walls of the buckle sleeves 241, and the other ends support on the side walls of the buckle blocks 242; and under the action of the buckle springs 243, the buckle blocks 242 pass through the release openings 2411 and enable the clamp blocks 2422 and the locking slots to snap.

Meanwhile, the positioning device 20 also includes a pulling device located in the panel fixing member 6; the pulling device includes a pulling cover plate 26, pulling link rods 25, and return springs 27, where the pulling cover plate 26, the pulling link rods 25 and the return springs 27 are all internally arranged in the panel fixing member 6, and the surface of the pulling cover plate 26 is provided with a pulling button 261 that extends out of the panel fixing member 6, where one ends of the return springs 27 abut against the inner wall of the panel fixing member 6, and the other ends support on the surface of the pulling cover plate 26 and make the pulling button 261 remain exposed; the buckle blocks 242 are self-provided with through holes, and the bottoms of the buckle blocks 242 are provided with slope notches 2421 that are communicated with the through holes; both sides of the pulling cover plate 26 are provided with the pulling link rods 25, which pass through the panel fixing member 6, the lifting rods 21 and the buckle blocks 242 in order, and the ends of the pulling link rods 25 are bent into an oblique line structure 251, where by means of the pulling button 261, the oblique line structure 251 at the ends of the pulling link rods 25 squeezes the slope notches 2421 of the buckle blocks 242, and makes the clamp blocks 2422 on the buckle blocks 242 move in a direction away from the locking slots.

The lifting working principle of the telescopic support 2 is specifically discussed as follows: by means of the pulling button 261, the oblique line structure 251 at the ends of the pulling link rods 25 squeezes the slope notches 2421 of the buckle blocks 242, and makes the clamp blocks 2422 on the buckle blocks 242 move in a direction away from the locking slots, so that the lifting rods 21 and the fixed rods 22 are disconnected. At this time, a user can pull the lifting rods 21 to adjust to any height, and then press the pulling button, so that the buckle blocks 242 pass through the release openings 2411 under the action of the buckle spring 243 and enable the clamp blocks 2422 and the locking slots to snap, thereby realizing the positioning.

As the telescopic support 2 of the first preferred embodiment of the invention, a telescopic laptop stand capable of freely lifting is specified, which stand including a panel 1, a base plate assembly 3, a base plate fixing member 5, and the telescopic support 2 as claimed in claim 1, where the base plate fixing member 5 is fixed on the surface of the base plate assembly 3, the panel 1 is hinged to the panel fixing member 6 via a first damping hinge member, and the ends of the telescopic support 2 are hinged to both sides of the base plate fixing member 5 via a second damping hinge member. The first damping hinge member includes corner connectors 72 and damping shafts 71, where the sides of the corner connectors 72 are movably equipped on the side surface of the panel fixing member 6 via the damping shafts 71, and the surfaces of the corner connectors 72 are fixedly connected to the bottom surface of the panel 1.

Therefore, the whole product can be conveniently stored when in a folded and contracted state. If the whole stand needs to be raised, the base plate of the panel 1 can be directly flipped, and the damping shafts 71 inside the panel fixing member 6 and the base plate fixing member 5 are used to achieve rotary lifting, so that the angle of the support panel 1 can be freely adjusted. At this time, a laptop can be placed. If the height needs to be adjusted again, the pulling button 261 can be pressed, and the lifting rods 21 can move up and down freely (For specific telescopic principles, please refer to the lifting working principle of the telescopic support 2 above).

Further, the surface of the panel 1 is provided with a receding opening 12 with the shape corresponding to that of the base plate fixing member 5. In the folded state, the base plate fixing member 5 can also pass directly through the receding opening 12, which makes the product flatter and easier to store.

Further, the base plate assembly 3 includes a first base plate 31 and a second base plate 32, where a boss 311 is arranged at the center of the first base plate 31, and the boss 311 is provided with teeth 312 in a circumferential direction thereof; a boss 311 hole is arranged at the center of the second base plate 32, the second base plate 32 is placed on the surface of the first base plate 31, and the boss 311 passes through the boss 311 hole; the surface of the second base plate 32 is provided with a meshing slot 321, which is internally equipped with a meshing spring 323 and meshing teeth 322, where one end of the meshing spring 323 is connected to the meshing slot 321, and the other end is connected to the meshing teeth 322, and the meshing teeth 322 are meshed with the teeth 312 under the action of the meshing spring 323. Meanwhile, a wireless charging module 4 is arranged on the surface of the boss 311, and a HUB module is arranged inside the base plate fixing member 5, where the surface of the base plate fixing member 5 is provided with a power supply port 81 that is connected to the HUB module, and several output interfaces 82.

The base plate assembly 3 includes a first base plate 31 and a second base plate 32. The second base plate 32 can rotate 360° around the boss 311 of the first base plate 31, which can drive the whole panel 1 to rotate 360°. Meanwhile, since the boss 311 is circumferentially provided with a plurality of teeth 312, the second base plate 32 is adjusted in a plurality of stages by means of the cooperation of the meshing teeth 322 and the teeth 312. When an appropriate angle is obtained through adjustment, the meshing teeth 322 are meshed with the teeth 312 under the action of the meshing spring 323 to achieve positioning. When other angles need to be obtained through adjustment, the second base plate 32 is pushed forcefully so that the meshing teeth 322 are not meshed with the corresponding teeth 312. Meanwhile, the product integrates a wireless charging module 4 and a HUB module, so that a user can also realize wireless charging for mobile terminals with a wireless charging function while using a laptop. Meanwhile, the HUB module can expand connection ports of the laptop, which is more convenient for office use.

Further, the base plate assembly 3 also includes a shielding plate 34, which is arranged on the surface of the boss 311 and shields the boss 311 and the meshing slot 321, and the wireless charging module 4 is arranged on the surface of the shielding plate 34. The shielding plate 34 can shield the meshing slot 321 and the boss 311, making the whole more beautiful and harmonious.

Further, the bottom of the second base plate 32 is provided with an annular track groove, the surface of the first base plate 31 is provided with a plurality of ball 33 slots, each ball 33 slot is equipped with a ball 33, and the balls 33 are clamped in the track groove. In order to make the rotation of the second base plate 32 smoother, balls 33 are arranged on the surface of the first base plate 31. When rotating relative to the first base plate 31, the second base plate 32 can drive the balls 33 to roll in the ball 33 slots.

Further, four corner ends of the panel 1 are provided with non-slip silicone pads 11, which can play a certain non-slip role. Moreover, one side of the panel 1 is provided with a baffle 13 used for preventing the laptop from falling. When the panel 1 is tilted, the baffle 13 can prevent the panel from falling.

Figure 6:
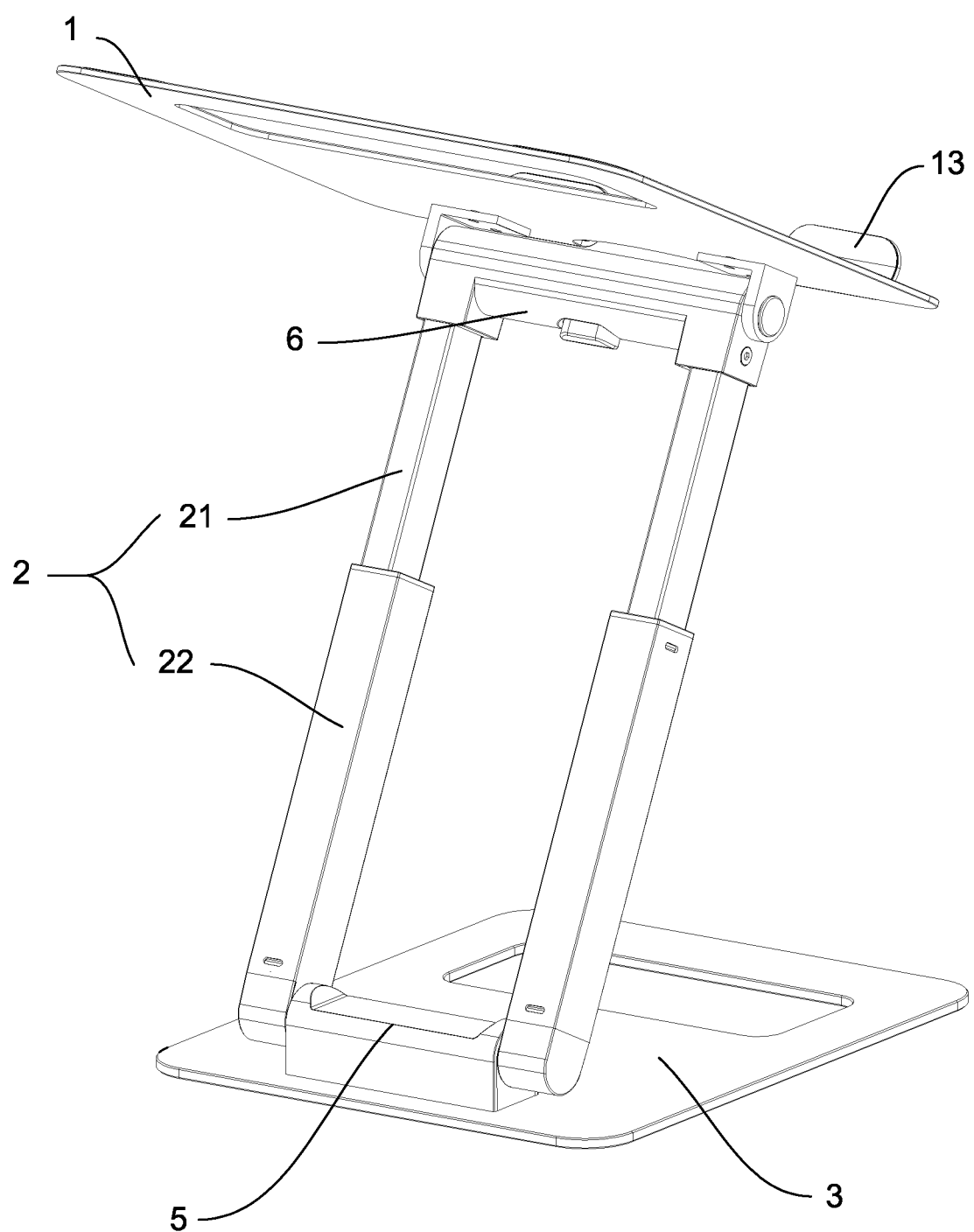
FIG. 6 is a perspective view of a laptop stand capable of freely lifting of a second preferred embodiment of the invention.

Referring to FIG. 6, a laptop stand capable of freely lifting of a second preferred embodiment of the invention is shown. The laptop stand comprises a telescopic support 2. The difference between the laptop stand of the second preferred embodiment and that of the above first preferred embodiment lies in that: the laptop stand of the first specific application supports wireless charging and HUB functions, and supports rotation at the same time; while there is no such function in the second preferred embodiment of telescopic laptop stand capable of freely lifting, that's because the base plate assembly 3 in the second preferred embodiment of telescopic laptop stand capable of freely lifting has only a single-layer base plate. Therefore, apart from the above difference, other structures are consistent with that in the first preferred embodiment of telescopic laptop stand capable of freely lifting.

While the invention has been described in terms of preferred embodiments, those skilled in the art will recognize that the invention can be practiced with modifications within the spirit and scope of the appended claims.

What is claimed is:

1. A telescopic support, comprising:
a positioning device;
a panel fixing member;
two fixed rods; and
two lifting rods having one ends disposed on two sides of the panel fixing member respectively, and the other ends disposed in the corresponding fixed rods respectively, the lifting rods configured to move in an axial direction of the fixed rods;

wherein the positioning device includes two clamp plates disposed on inner side walls of the fixed rods respectively, two buckle assemblies disposed at lower ends of the lifting rods respectively, and a plurality of locking slots disposed in surfaces of the clamp plates.

2. The telescopic support of claim 1, wherein each of the buckle assemblies include a buckle spring, a buckle block having a clamp block, and a buckle sleeve having a release opening with the buckle block disposed therein; wherein the buckle sleeves are disposed on the lower ends of the lifting rods, and the buckle blocks and the buckle springs are all disposed in the buckle sleeves; and wherein the buckle springs are biased between the buckle sleeves so that the clamp blocks are configured to moveably dispose in the locking slots.

3. The telescopic support of claim 2, wherein the positioning device further comprises a pulling device disposed in the panel fixing member; wherein the pulling device includes a pulling cover plate, two pulling link rods, and two return springs, wherein the pulling cover plate, the pulling link rods, and the return springs are disposed in the panel fixing member; wherein the pulling cover plate includes a pulling button on a surface; wherein the return springs are biased between the panel fixing member and the pulling cover plate; wherein the buckle blocks further comprise through holes and slope notches communicating with the through holes; wherein one ends of the pulling link rods pass through two sides of the pulling cover plate respectively and the other ends thereof pass through the panel fixing member, the lifting rods, and the buckle blocks sequentially; wherein the pulling link rod includes an oblique line structure at the other end; wherein the oblique line structures pass through the through holes and the slop notches of the buckle blocks; and wherein in response to pressing the pulling button, the oblique line structures squeeze the slope notches to disengage the clamp blocks from the locking slots.

* * * * *